US012267092B2

(12) United States Patent
Atashbahar et al.

(10) Patent No.: US 12,267,092 B2
(45) Date of Patent: Apr. 1, 2025

(54) COMMUNICATION TERMINAL CONFIGURED TO ADJUST FOR INTERFERENCE AND METHODS OF USE

(71) Applicant: Hughes Network Systems, LLC, Germantown, MD (US)

(72) Inventors: Sattar Atashbahar, San Diego, CA (US); Bill Whitmarsh, San Diego, CA (US); Piyush Kamal, San Diego, CA (US)

(73) Assignee: Hughes Network Systems, LLC, Germantown, MD (US)

( * ) Notice: Subject to any disclaimer, the term of this patent is extended or adjusted under 35 U.S.C. 154(b) by 185 days.

(21) Appl. No.: 17/562,204

(22) Filed: Dec. 27, 2021

(65) Prior Publication Data

US 2023/0208456 A1  Jun. 29, 2023

(51) Int. Cl.
*H04B 1/04* (2006.01)
*H04B 1/10* (2006.01)
*H04B 1/12* (2006.01)
*H04B 17/29* (2015.01)

(52) U.S. Cl.
CPC ......... *H04B 1/0475* (2013.01); *H04B 1/0458* (2013.01); *H04B 1/1018* (2013.01); *H04B 1/1036* (2013.01); *H04B 2001/0408* (2013.01)

(58) Field of Classification Search
None
See application file for complete search history.

(56) References Cited

U.S. PATENT DOCUMENTS

| 5,222,106 A | 6/1993 | Satoh et al. | |
|---|---|---|---|
| 5,901,173 A * | 5/1999 | Stephens | H03G 3/3052 375/345 |
| 6,094,463 A * | 7/2000 | Stephens | H03G 3/3052 375/345 |

(Continued)

FOREIGN PATENT DOCUMENTS

WO  WO-2013016395 A2 *  1/2013  ........... H03G 3/3078

OTHER PUBLICATIONS

International Search Report and Written Opinion issued May 8, 2023 in corresponding International Application No. PCT/US22/23931.

*Primary Examiner* — Pablo N Tran
(74) *Attorney, Agent, or Firm* — Global IP Counselors, LLP

(57) ABSTRACT

Communication terminals configured for satellite and terrestrial communications and methods of use are disclosed herein. In an embodiment, a communication terminal includes an antenna, a filter and filter control circuitry. The antenna is configured to receive a radio signal. The filter is configured to filter the radio signal to remove an interference signal. The filter control circuitry is configured to detect the interference signal present in the radio signal received by the antenna and cause an adjustment to the filter to block the interference signal. In another embodiment, the communication terminal includes an amplifier and gain control circuitry. The amplifier is configured to configured to amplify the radio signal. The gain control circuitry is configured to detect an interference signal present in the radio signal received by the antenna and cause an adjustment to the amplifier based on the detected interference signal.

20 Claims, 6 Drawing Sheets

(56) References Cited

U.S. PATENT DOCUMENTS

| | | | |
|---|---|---|---|
| 6,229,858 B1* | 5/2001 | Stephens | H03G 3/3052 |
| | | | 375/345 |
| 7,120,427 B1* | 10/2006 | Adams | H03F 3/68 |
| | | | 455/418 |
| 7,362,178 B2 | 4/2008 | Montemayor et al. | |
| 9,571,053 B1 | 2/2017 | Cousinard et al. | |
| 2004/0042569 A1 | 3/2004 | Casabona et al. | |
| 2008/0031387 A1* | 2/2008 | Shin | H04L 27/2647 |
| | | | 375/345 |
| 2010/0029235 A1 | 2/2010 | Bouillet | |
| 2013/0142295 A1 | 6/2013 | Badke et al. | |
| 2020/0067552 A1 | 2/2020 | Dent et al. | |

* cited by examiner

COMMUNICATION TERMINAL CONFIGURED TO ADJUST FOR INTERFERENCE AND METHODS OF USE

BACKGROUND

Field of the Invention

The present disclosure generally relates to a communication terminal configured for satellite and terrestrial communications and its methods of use. In particular, the present disclosure relates to a communication terminal configured to detect interference in a radio signal and make one or more adjustment to account for the interference.

Background Information

Communication terminals can be configured to provide access to both satellite and terrestrial links for low data rate services such as the Internet of Tings (IoT) and Low Power Wide Area Networks (LPWANs). These communication terminals require interoperability on both satellite and terrestrial networks in the same frequency bands.

SUMMARY

The present disclosure provides a communication terminal which uses a single receiver for communication via satellite and terrestrial systems, thus reducing its cost, size and power consumption. The communication terminal is designed with a dynamic range to operate in a terrestrial system where there are high levels of in-band interference. The communication terminal has receiver architecture designed with a low noise figure for improved sensitivity when communicating via satellite and is configured to adaptively adjust its linearity by suppressing high power interferences close to the receiving frequency range. The communication terminal is configured to determine the presence and measure the level and frequency of interference and readjust itself to cancel the interference. The ability of the communication terminal to adaptively reconfigure its front-end eliminates the need for a design that is always configured for a high dynamic range which consumes more power. The disclosed design reduces power consumption and extends battery life by making sure that the receiver enters interference canceling mode only when the terminal is near or within a terrestrial coverage area or when it detects a strong interferer. When the communication terminal is communicating through a direct satellite link in the absence of strong interference, the receiver front-end remains in low power operation.

In view of the state of the known technology, one aspect of the present disclosure is to provide a communication terminal configured for satellite and terrestrial communications. The communication terminal includes an antenna, a filter and filter control circuitry. The antenna is configured to receive a radio signal. The filter is configured to filter the radio signal to remove an interference signal. The filter control circuitry is configured to detect the interference signal present in the radio signal received by the antenna and cause an adjustment to the filter to block the interference signal.

Another aspect of the present disclosure is to provide another communication terminal configured for satellite and terrestrial communications. The communication terminal includes an antenna, an amplifier and gain control circuitry. The antenna is configured to receive a radio signal. The amplifier is configured to amplify the radio signal. The gain control circuitry is configured to detect an interference signal present in the radio signal received by the antenna and cause an adjustment to the amplifier based on the detected interference signal.

Another aspect of the present disclosure is to provide another communication terminal configured for satellite and terrestrial communications. The communication terminal includes an antenna, a filter, an amplifier, at least one power detector, and control circuitry. The antenna is configured to receive a radio signal. The filter is configured to filter the radio signal. The amplifier is configured to amplify the radio signal. The at least one power detector is configured to detect power related to the radio signal. The control circuitry is configured to cause an adjustment to at least one of the filter or the amplifier based on an output from the at least one power detector.

Also, other objects, features, aspects and advantages of the disclosed devices, systems and methods will become apparent to those skilled in the art in the field of satellite systems and other communication systems from the following detailed description, which, taken in conjunction with the annexed drawings, discloses preferred embodiments of devices, systems and methods with various features.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
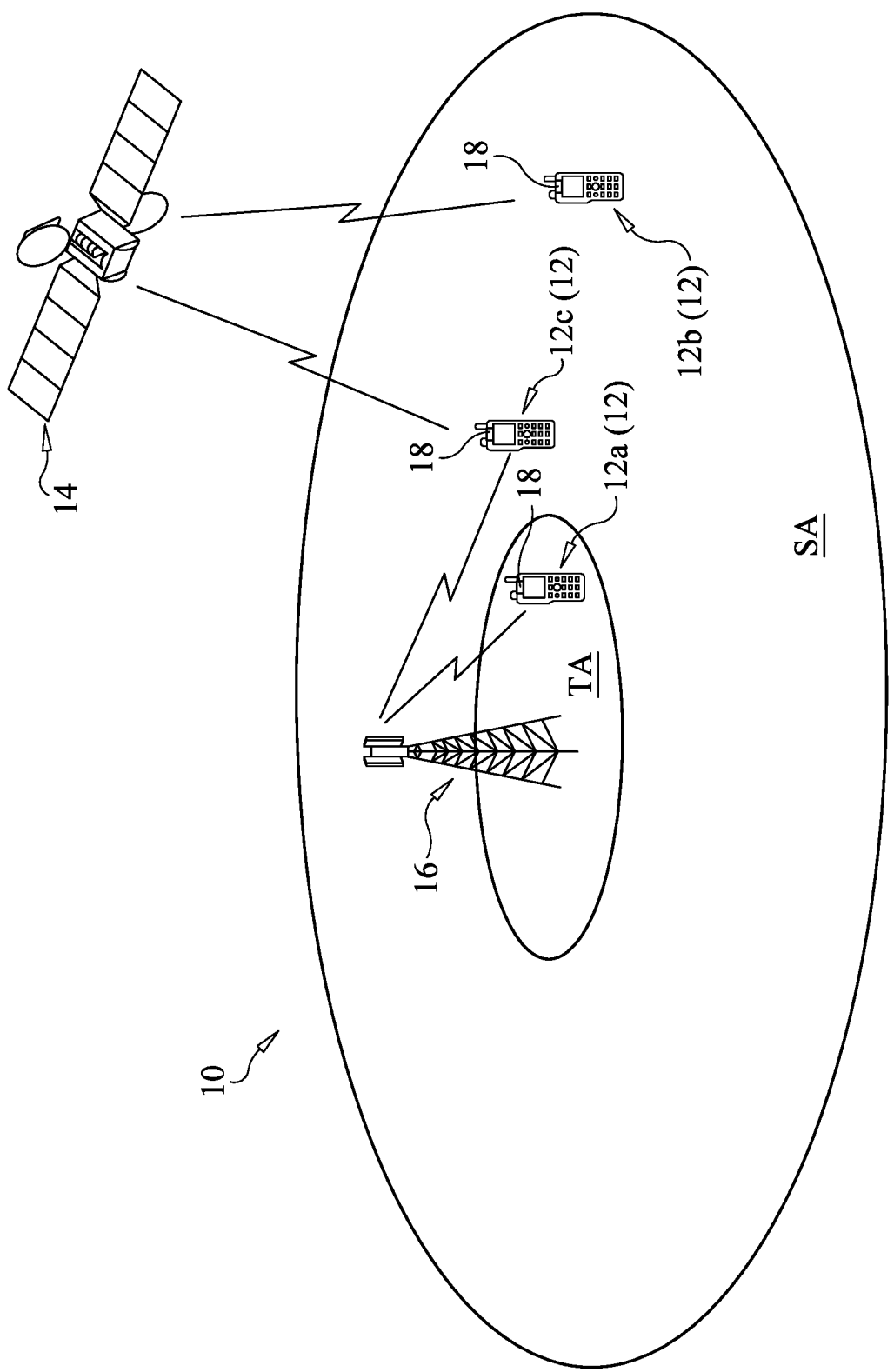
FIG. 1 illustrates an example embodiment of a communication system in accordance with the present disclosure.

FIG. 1 illustrates an example embodiment of a communication system 10 in accordance with the present disclosure. The communication system 10 includes and is enabled by at least one communication terminal 12. The communication system 10 also includes a satellite 14 and a terrestrial tower 16. Each communication terminal 12 is configured to communicate via both of the satellite 14 and the terrestrial tower 16. Thus, each communication terminal 12 is configured for satellite and terrestrial communications. As shown in FIG. 1, the satellite 14 has a satellite coverage area SA, for example, as defined by a satellite spot beam as understood in the art. A communication terminal 12 within the satellite coverage area SA can send and/or receive data using radio signals via the satellite 14. Likewise, the terrestrial tower 16 has a terrestrial coverage area TA such that a communication terminal 12 within the terrestrial coverage area TA can send and/or receive data using radio signals via the terrestrial tower 16.

In FIG. 1, the communication terminals 12 include a first communication terminal 12a operated by a first user, a second communication terminal 12b operated by a second user, and a third communication terminal 12c operated by a third user. The first communication terminal 12a is located within the terrestrial coverage area TA and is communicating via radio signals with the terrestrial tower 16. The second communication terminal 12b and the third communication terminal 12c are located within the satellite coverage area SA and are communicating via radio signals with the satellite 14. The third communication terminal 12c is also located close enough to the terrestrial tower 16 for the terrestrial tower 16 to interfere with the communications via the satellite 14. As explained in more detail below, the communication terminal 12 of the present disclosure is configured to correct for this and other types of interference.

Each communication terminal 12 includes a controller 18. As understood in the art, the controller 18 preferably includes a microcomputer with a control program that controls the other components as discussed herein. The controller 18 can also include other conventional components such as an input interface circuit, an output interface circuit, and storage devices such as a ROM (Read Only Memory) device and a RAM (Random Access Memory) device. The ROM and RAM store processing results and control programs that are run by the controller 18. The controller 18 is operatively coupled to the other components of the communication terminal 12 as appropriate, in a conventional manner. It will be apparent to those skilled in the art from this disclosure that the precise structure and algorithms for the controller 18 can be any combination of hardware and software that will carry out the functions of the present disclosure.

Figure 2:
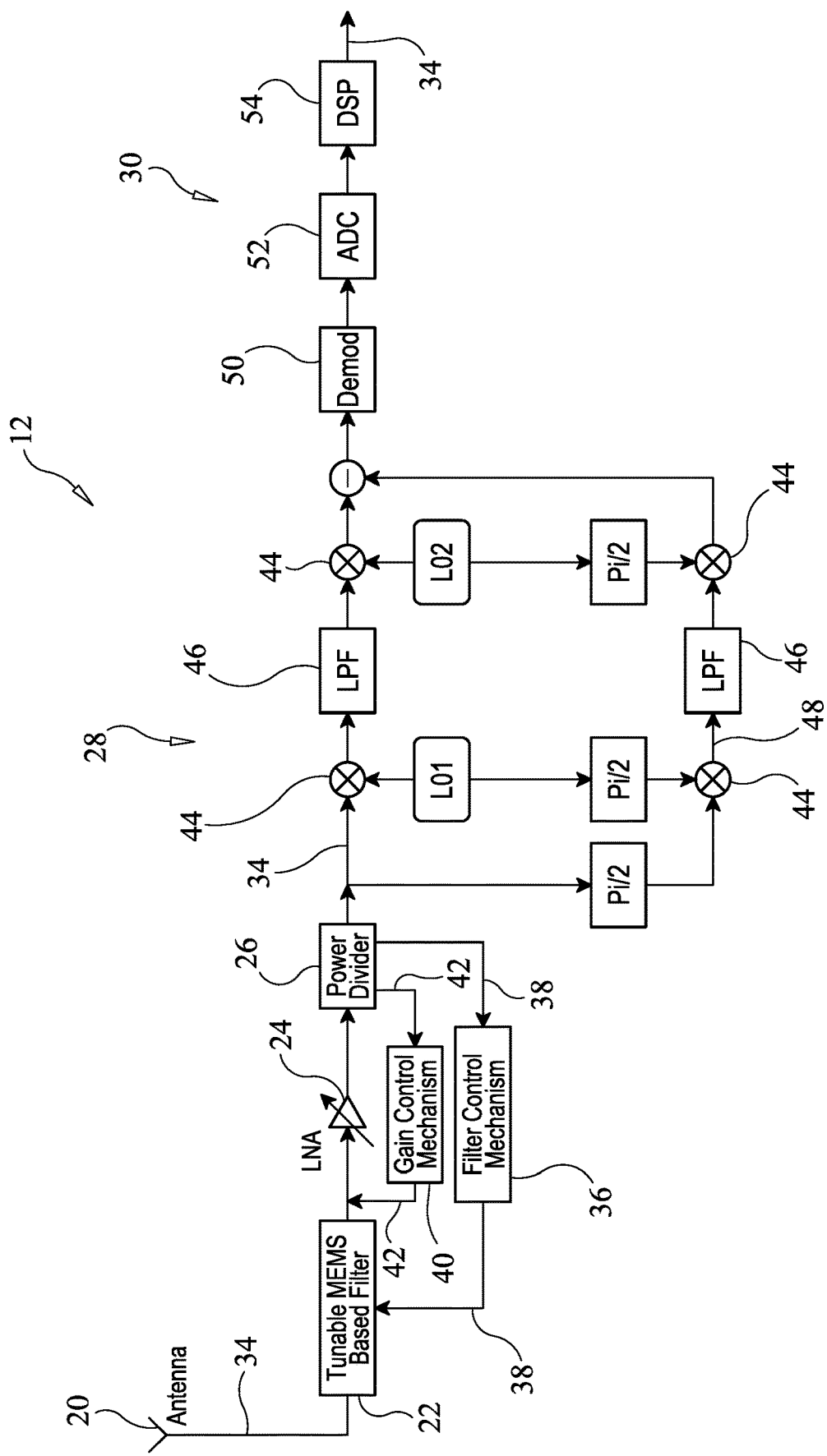
FIG. 2 illustrates a schematic diagram of an example embodiment of the components of a communication terminal in accordance with the present disclosure.
Figure 3:
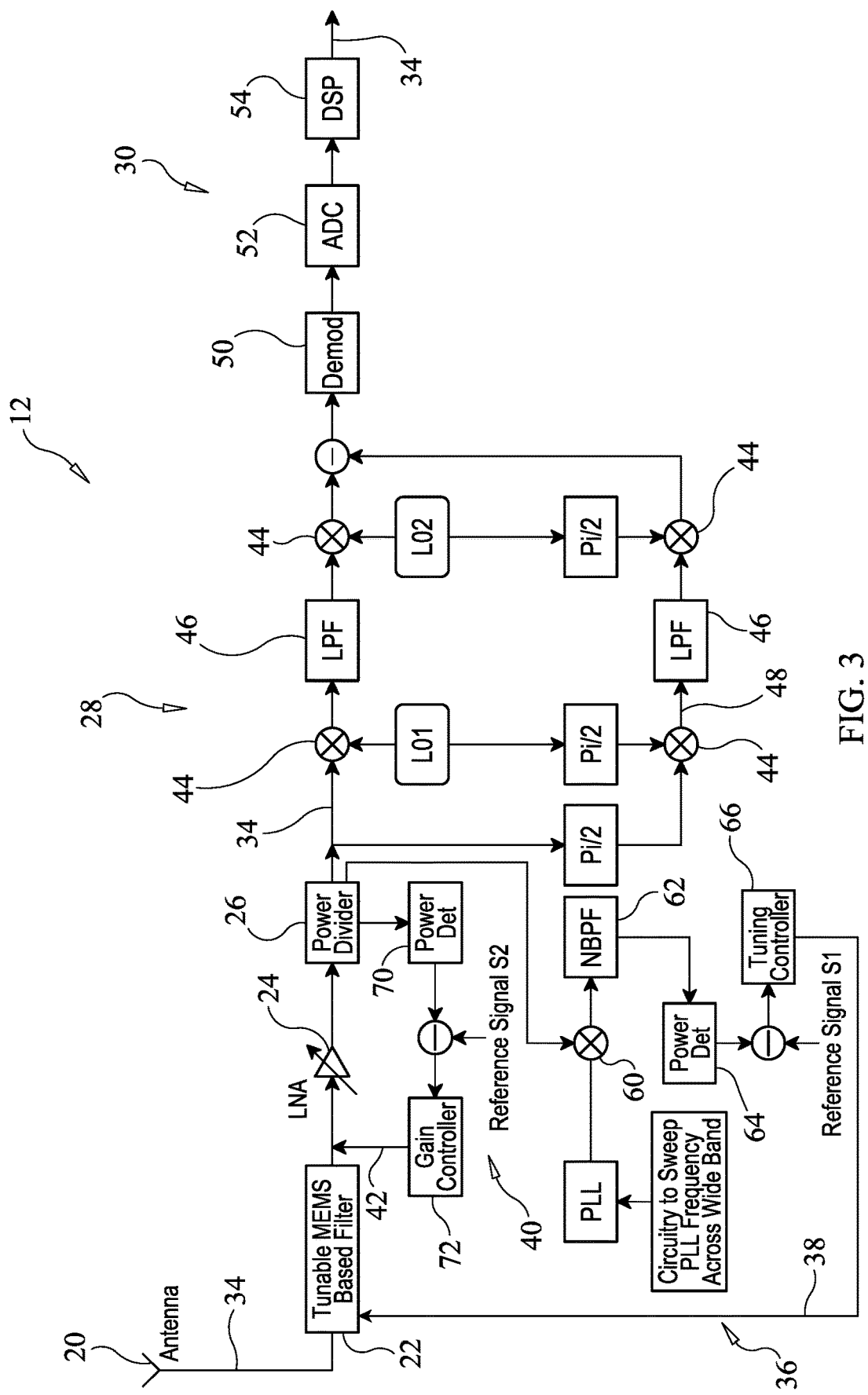
FIG. 3 illustrates a schematic diagram of another example embodiment of the components of a communication terminal in accordance with the present disclosure.
Figure 4:
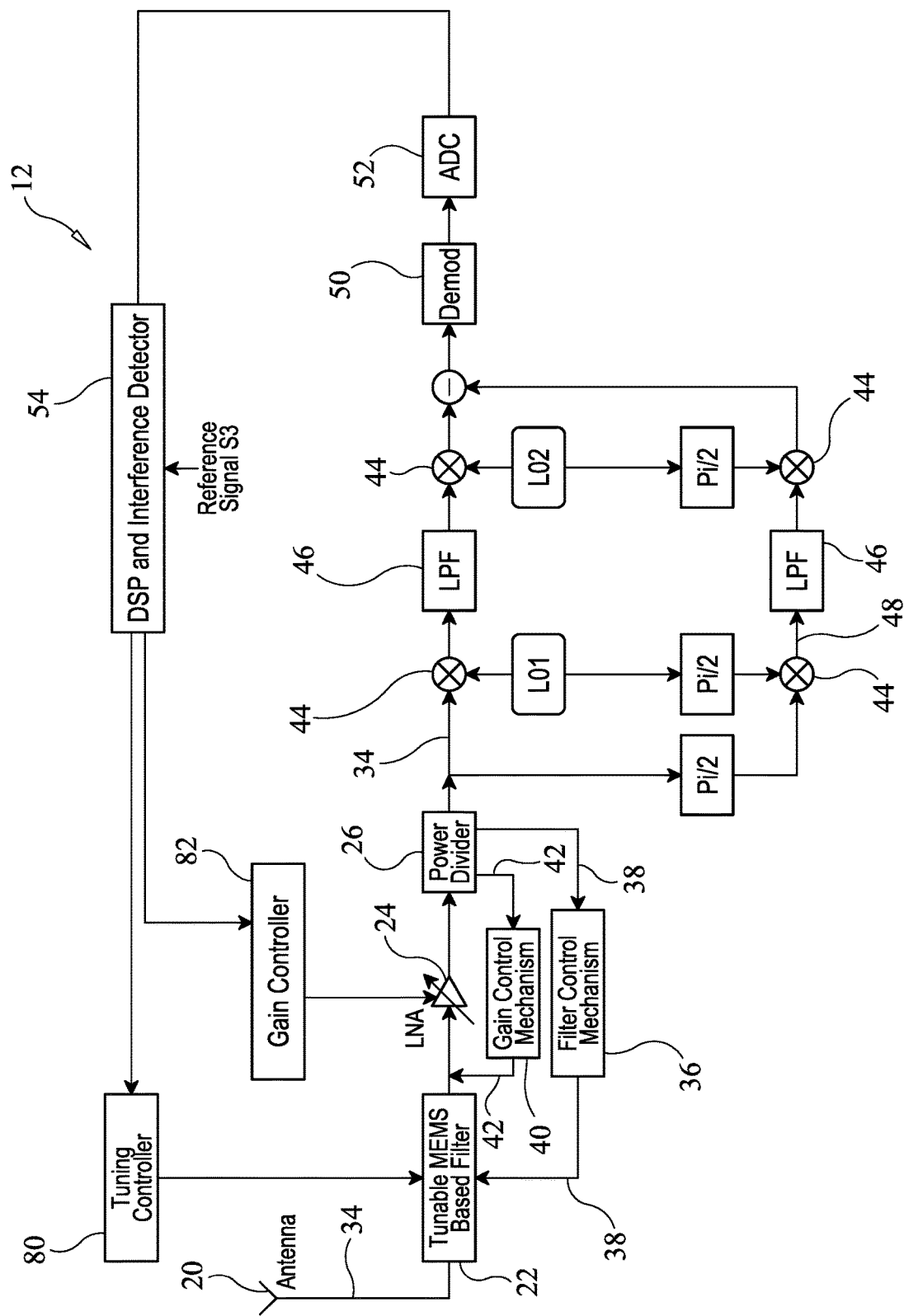
FIG. 4 illustrates a schematic diagram of another example embodiment of the components of a communication terminal in accordance with the present disclosure.

FIGS. 2-4 illustrate schematic diagrams of example embodiments of a communication terminal 12. As illustrated, the communication terminal 12 includes an antenna 20. The antenna 20 is configured to send and/or receive radio signals via both of the satellite 14 and the terrestrial tower 16. For the purpose of the present disclosure, the antenna 20 is described during reception of a radio signal. The radio signal can be or include a satellite signal (e.g., from the satellite 14) and/or a terrestrial signal (e.g., from the terrestrial tower 16). Satellite signals are typically transmitted in different frequency ranges (e.g., S-band, L-band) than terrestrial radio signals (e.g., close to L-band), as understood by those of ordinary skill in the art. The radio signal can also be or include an interference signal, which the communication terminal 12 is designed to reduce or eliminate in accordance with the structure and methods described herein. In an embodiment, the interference signal can be a terrestrial signal interfering with a desired satellite signal. The radio signal received at the antenna 20 can include both a desired signal (e.g., a satellite or terrestrial signal) and an interference signal, wherein the communication terminal 12 described herein is configured to reduce or eliminate the interference signal and process the desired signal. A radio signal received at the antenna 20 can also be entirely caused by interference.

As illustrated in FIG. 2, the communication terminal 12 includes one or more of a filter 22, an amplifier 24, a power divider 26, conversion circuitry 28, and processing circuitry 30. The filter 22, the amplifier 24, the power divider 26, the conversion circuitry 28, and processing circuitry 30 are located along a primary signal path 34. In the illustrated embodiment, the primary path extends from the antenna 20 to the processing circuitry 30. The communication terminal 12 also includes filter control circuitry 36. The filter control circuitry 36 is located along a filter control path 38 which branches off of the primary signal path 34 (e.g., at the power divider 26 in the illustrated embodiment). The communication terminal 12 also includes gain control circuitry 40. The gain control circuitry 40 is located along a gain control path 42 which branches off of the primary signal path 34 (e.g., at the power divider 26 in the illustrated embodiment).

The filter 22 is configured to filter radio signals received by the antenna 20 to remove interference. More specifically, the filter 22 is configured to block an interfering frequency, thus passing a desired signal frequency while filtering out the interfering frequency. The filter 22 is configured to filter the interfering frequency, for example, using a notch or blocker at the center of the interfering frequency. Adjustment of the filter 22 to reject an interfering frequency is discussed in more detail below.

The filter 22 receives radio signals from the antenna 20. The filter 22 is configured to output desired signals along the primary signal path 34 while blocking one or more interference signal. The filter 22 is thus configured to remove one or more interference signal from the radio signal received at the antenna 20. The filter 22 is configured to be adjusted (e.g., tuned) to remove the one or more interference signals based on frequency. As explained in more detail below, the filter control circuitry 36 is configured to detect the interference signal present in the radio signal received by the antenna 20 and cause an adjustment to the filter 22 to block the interference signal. More specifically, the filter control circuitry 36 is configured to detect the interference signal in real time and cause the adjustment to the filter 22 only while the interference signal is present. That is, the filter control circuitry 36 is configured to determine when the interference signal is no longer present at the antenna 20 (e.g., at the frequency band of operation) and cease causing the adjustment to the filter 22 when the interference signal is no longer present.

In the illustrated embodiment, the filter 22 is a tunable MEMS (microelectromechanical system) filter. The filter 22 is configured to be tuned by an applied voltage. The filter 22 is configured to be tuned to remove an interfering frequency from the radio signal based on the center of the interfering frequency. The amount of applied voltage for tuning the filter 22 to reject specific frequencies can be determined via calibration. As described in more detail below, the filter control circuitry 36 is configured to detect the interference signal and adjust the applied voltage to the filter 22 to block the frequency of the interference signal.

The amplifier 24 is configured to amplify the radio signal. In the illustrated embodiment, the amplifier 24 is configured to amplify the radio signal after the radio signal has been filtered by the filter 22. The amplifier 24 is configured to be adjusted (e.g., tuned) to amplify radio signals by a predetermined amount. As discussed in more detail below, the gain control circuitry 40 is configured to detect an interference signal present in the radio signal received by the antenna 20 and cause an adjustment to the amplifier 24 based on the detected interference signal. More specifically, the gain control circuitry 40 is configured to detect the interference signal in real time and cause the adjustment to the amplifier 24 only while the interference signal is present, thus conserving power when possible. That is, the gain control circuitry 40 is configured to determine when the interference signal is no longer present at the antenna 20 and cease causing the adjustment to the amplifier 24 when the interference signal is no longer present In the illustrated embodiment, the amplifier 24 is a low-noise amplifier (LNA). The amplifier 24 has a dynamic range with a low end and a high end. In an embodiment, the low end is set to be as sensitive as possible for satellite communications, and the high end is biased to account for interference. However, biasing the amplifier 24 in the high range requires more power. To conserve power, the gain control circuitry 40 only increases the higher dynamic range of the amplifier 24 when needed to account for interference.

The power divider 26 is configured to direct the radio signal to the filter control path 38 and/or the gain control path 42. The power divider 26 directs the radio signal to the filter control circuitry 36 via the filter control path 38. The power divider 26 also directs the radio signal to the gain control circuitry 40 via the gain control path 42. The power divider 26 can be a standard power divider known to those of ordinary skill in the art.

The conversion circuitry 28 is configured to modulate the radio signal for processing at the processing circuitry 30. For example, the conversion circuitry 28 is configured to downconvert the radio signal and/or remove innate signals from the radio signal. In the illustrated embodiment, the conversion circuitry 28 includes one or more mixer 44 and one or more filter 46 located along the primary signal path 34 and/or a secondary signal path 48. In the illustrated embodiment, the filters 46 are low pass filters. The mixers 44 and filters 46 can be standard components known to those of ordinary skill in the art. There are various ways to structure the conversion circuitry 28 as will be understood by those of ordinary skill in the art.

The processing circuitry 30 is configured to process the radio signal. In the illustrated embodiment, the processing circuitry includes a demodulator 50, an analog-to-digital converter 52 and a digital signal processor 54. The demodulator 50 is configured to demodulate the radio signal so as to extract relevant information, as known in the art. The analog-to-digital converter (ADP) 52 is configured to convert the radio signal to a digital signal, as known in the art. The digital signal processor (DSP) 54 is configured to process the digital signal, as known in the art. The demodulator 50, the analog-to digital converter 52 and the digital signal processor 54 can be or include standard components known to those of ordinary skill in the art.

The filter control circuitry 36 is configured to detect an interference signal present in the radio signal received by the antenna 20 and cause an adjustment to the filter 22 to block the interference signal. In the illustrated embodiment, the filter control circuitry 36 receives the radio signal output from the filter 22 and thereafter causes an adjustment to the filter 22 to eliminate the interference. The filter control circuitry 36 is configured to cause the adjustment to the filter 22 by adjusting a voltage applied to the filter 22. The filter control circuitry 36 is configured to cause the adjustment to the filter 22 based on a detected power of the radio signal received by the antenna 20. More specifically, the filter control circuitry 36 is configured to trigger the adjustment to the filter 22 based on a difference between the detected power and a reference interference signal S1 or a related threshold. The filter control circuitry 36 can also be configured to cause the adjustment to the filter 22 based on an output from the digital signal processor 52.

The gain control circuitry 40 is configured to detect an interference signal present in the radio signal received by the antenna 20 and cause an adjustment to the amplifier 24 based on the detected interference signal. In the illustrated embodiment, the gain control circuitry 40 receives the radio signal output from the amplifier 24 and thereafter causes an adjustment to the amplifier 24 to eliminate the interference. The gain control circuitry 40 is configured to cause the adjustment to the amplifier 24 by adjusting a voltage applied to the amplifier 24. The gain control circuitry 40 is configured to cause the adjustment to the amplifier 24 based on a detected power of the radio signal. More specifically, the gain control circuitry 40 is configured to cause the adjustment to the amplifier 24 based on a difference between the detected power and a reference interference signal S2 or a related threshold. The gain control circuitry 40 can also be configured to cause the adjustment to the amplifier 24 based on output from the digital signal processor 52.

In the illustrated embodiment, the filter control circuitry 36 and the gain control circuitry 40 each receive the radio signal present at the antenna 20 via the power divider 26 after the radio signal has passed the filter 22 and the amplifier 24. In an embodiment, the controller 18 is configured to adjust and/or control the filter control circuitry 36 and/or the gain control circuitry 40. The components illustrated in FIGS. 2-4 can also be arranged differently.

FIG. 3 illustrates a first example embodiment of the filter control circuitry 36. In the embodiment illustrated in FIG. 3, the filter control circuitry 36 includes a mixer 60, a filter 62, a power detector 64 and a tuning controller 66. The mixer 60, the filter 62, the power detector 64 and the tuning controller 66 are located along the filter control path 38 which receives the radio signal output from the power divider 26.

The mixer 60 is configured to convert the radio signal. More specifically, the mixer 60 is configured to downconvert the radio signal based on a PLL (phase-locked loop) frequency. As illustrated, the mixer 60 receives both the radio signal and a PLL signal as inputs. In the illustrated embodiment, the PLL signal can be received via circuitry which sweeps the PLL frequency across wideband. In an embodiment, the controller 18 is configured to control the circuitry sweeping the PLL frequency.

The filter 62 is configured to filter the radio signal. More specifically, the filter 62 is configured to filter the converted radio signal output from the mixer 60. In the illustrated embodiment, the filter 62 includes a narrow band-pass filter (NBPF). The filter 62 is configured to pass frequencies within a certain range and reject frequencies outside of that range.

The power detector 64 detects the power of the radio signal. More specifically, the power detector detects the power of the converted radio signal from the mixer 60 and the filter 62. In the illustrated embodiment, the power detector 64 is an RF power detector configured to generate an output voltage proportional to the RF power of the radio signal. The filter control circuitry 36 is configured to cause the adjustment to the filter 22 based on the output from the power detector 64.

The filter control circuitry 36 receives a reference interference signal S1 and/or a related interference threshold. In an embodiment, the filter control circuitry 36 receives reference interference signal S1 or related interference threshold from the controller 18. In the illustrated embodiment, the filter control circuitry 36 subtracts the reference interference signal S1 from the output signal from the power detector 64 such that the tuning controller 66 receives an adjusted reference signal to use for tuning the filter 22. The reference interference signal S1 can be determined and/or adjusted by the controller 18, for example, based on calibration.

The tuning controller 66 causes an adjustment to the filter 22 based on the output from the power detector 64. More specifically, the tuning controller 66 causes an adjustment to the filter 22 based on a difference between the output from the power detector 64 and the reference interference signal S1 or a related interference threshold. The tuning controller 66 can compare the output from the power detector 64 to an interference threshold set point related to the reference interference signal S1, or the tuning controller 66 can receive the adjusted reference signal (e.g., by subtracting the reference interference signal S1 from the output signal from the power detector 64 prior to the tuning controller 66). In the illustrated embodiment, for example, if the output signal from the power detector 64 is above the reference interference level, then the tuning controller 66 causes the adjustment to the filter 22 (e.g., directly or via the controller 18). The adjustment can be to place a notch in the filter 22 at an interfering frequency of the interference signal (e.g., placement of the notch as determined by calibration). The tuning controller 66 can cause the adjustment by adjusting a control voltage to the filter 22. If the output signal from the power detector 64 is below the reference interference level, then the tuning controller 66 does not apply the control voltage which causes the filter 22 to block an interfering frequency. This way, the filter control circuitry 36 only adjusts the filter 22 when the interference is present.

Figure 5:
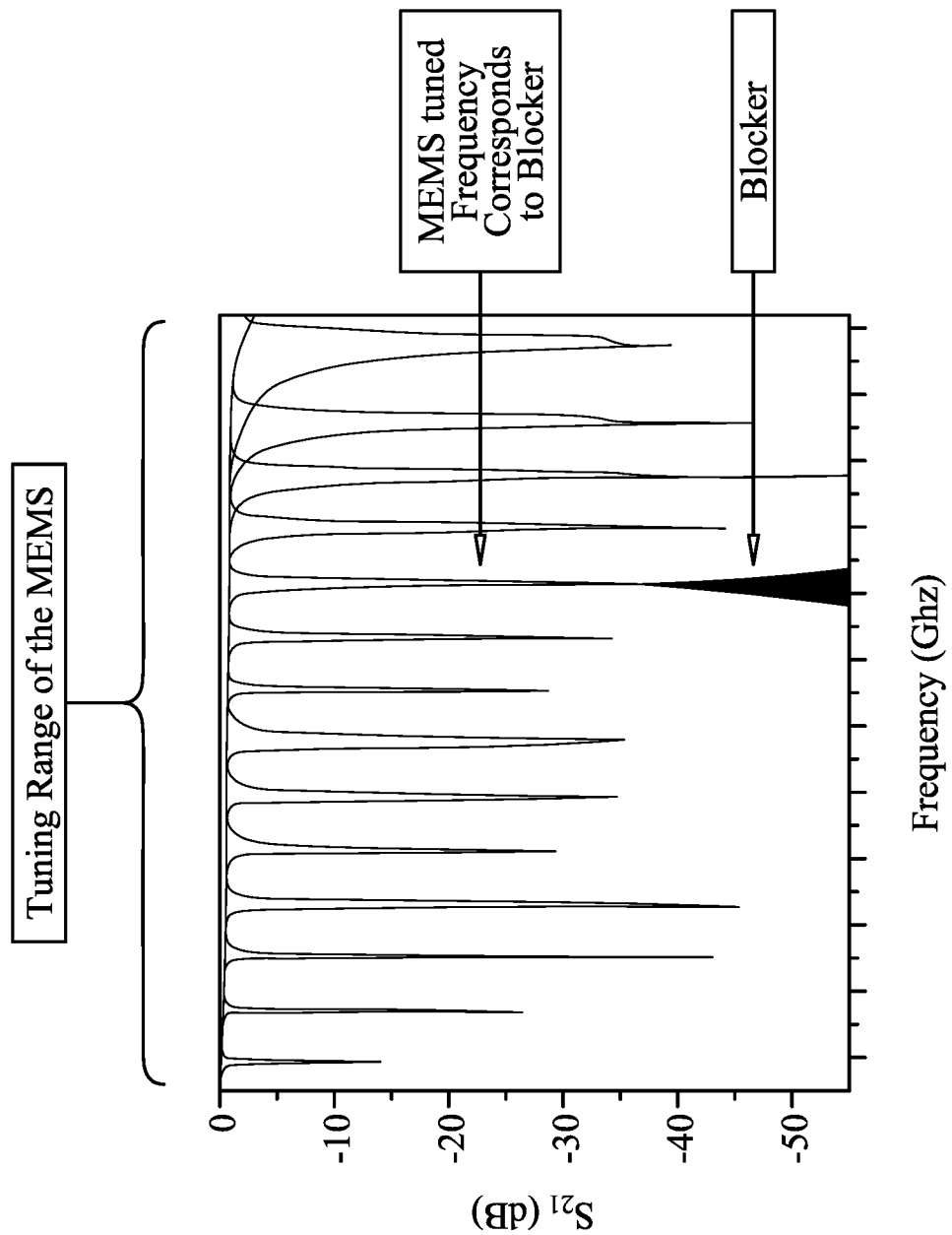
FIG. 5 illustrates an example embodiment of an adjustment to a filter of a communication terminal in accordance with the present disclosure.

FIG. 5 illustrates an example embodiment of an adjustment to the filter 22. In the illustrated embodiment, the filter 22 is an MEMS notch filter. The tuning controller 66 is configured to cause the filter 22 to alter its tuning range via placement of a blocker at an interfering frequency. The interfering frequency is determined by the difference between the output signal from the power detector 64 and the reference interference signal S1 or a related threshold. The blocker prevents the interfering frequency from passing through the filter 22, such that only a desired signal without the interference signal passes through the filter 22. The tuning controller 66 is configured to cause the adjustment to the filter 22, for example, by applying/adjusting a voltage applied to the filter 22. This tunes the center frequency of the filter 22. The amount of applied voltage vs. frequency can be determined during calibration of the filter 22. In an embodiment, the blocker is attenuated more than 20 dB by tuning the center frequency of the filter to the blocker's frequency. The filter control circuitry 36 is thus configured to cause the filter 22 to block a center frequency of the interference signal.

The gain control circuitry 40 is configured to detect an interference signal present in the radio signal received by the antenna 20 and cause an adjustment to the amplifier 24 based on the detected interference signal. More specifically, the gain control circuitry 40 is configured to cause the adjustment to the amplifier 24 by applying/adjusting a voltage applied to the amplifier 24. In the embodiment illustrated in FIG. 3, the gain control circuitry 40 includes a power detector 70 and a gain controller 72. The power detector 70 and the gain controller 72 are located along the gain control path 42 which receives the radio signal from the power divider 26.

The power detector 70 detects the power in the radio signal. In the illustrated embodiment, the power detector 70 is an RF power detector configured to generate an output voltage proportional to the RF power of the radio signal. The gain control circuitry 40 is configured to cause the adjustment to the amplifier 24 based on the output from the power detector 70.

The gain control circuitry 40 receives a reference interference signal S2 and/or a related interference threshold. In an embodiment, the gain control circuitry 40 receives reference interference signal S1 or related interference threshold from the controller 18. In the illustrated embodiment, the gain control circuitry 40 subtracts the reference interference signal S2 from the output signal from the power detector 70 such that the gain controller 72 receives an adjusted reference signal to use for tuning the amplifier 24. The reference interference signal S2 can be determined and/or adjusted by the controller 18, for example, based on calibration.

The gain controller 72 triggers an adjustment to the amplifier 24 based on the output from the power detector 70. More specifically, the gain controller 72 causes an adjustment to the amplifier 24 based on a difference between the output from the power detector 70 and the reference interference signal S2 or a related interference threshold. The gain controller 72 can compare the output from the power detector 70 to an interference threshold set point related to the reference interference signal S2, or the gain controller 72 can receive the adjusted reference signal (e.g., by subtracting the reference interference signal S2 from the output signal from the power detector 70 prior to the gain controller 72). In the illustrated embodiment for example, if the output signal from the power detector 70 is above the reference interference level, then the gain controller 70 causes the adjustment to the amplifier (e.g., directly or via the controller 18). The adjustment can be to adjust the linearity of the amplifier 24. The gain controller 70 can cause the adjustment by adjusting a control voltage to the amplifier 24. If the output signal from the power detector 70 is below the reference interference level, then the gain controller 70 does not apply the control voltage. This way, the gain control circuitry 40 only adjusts the filter 22 when the interference is present.

Figure 6:
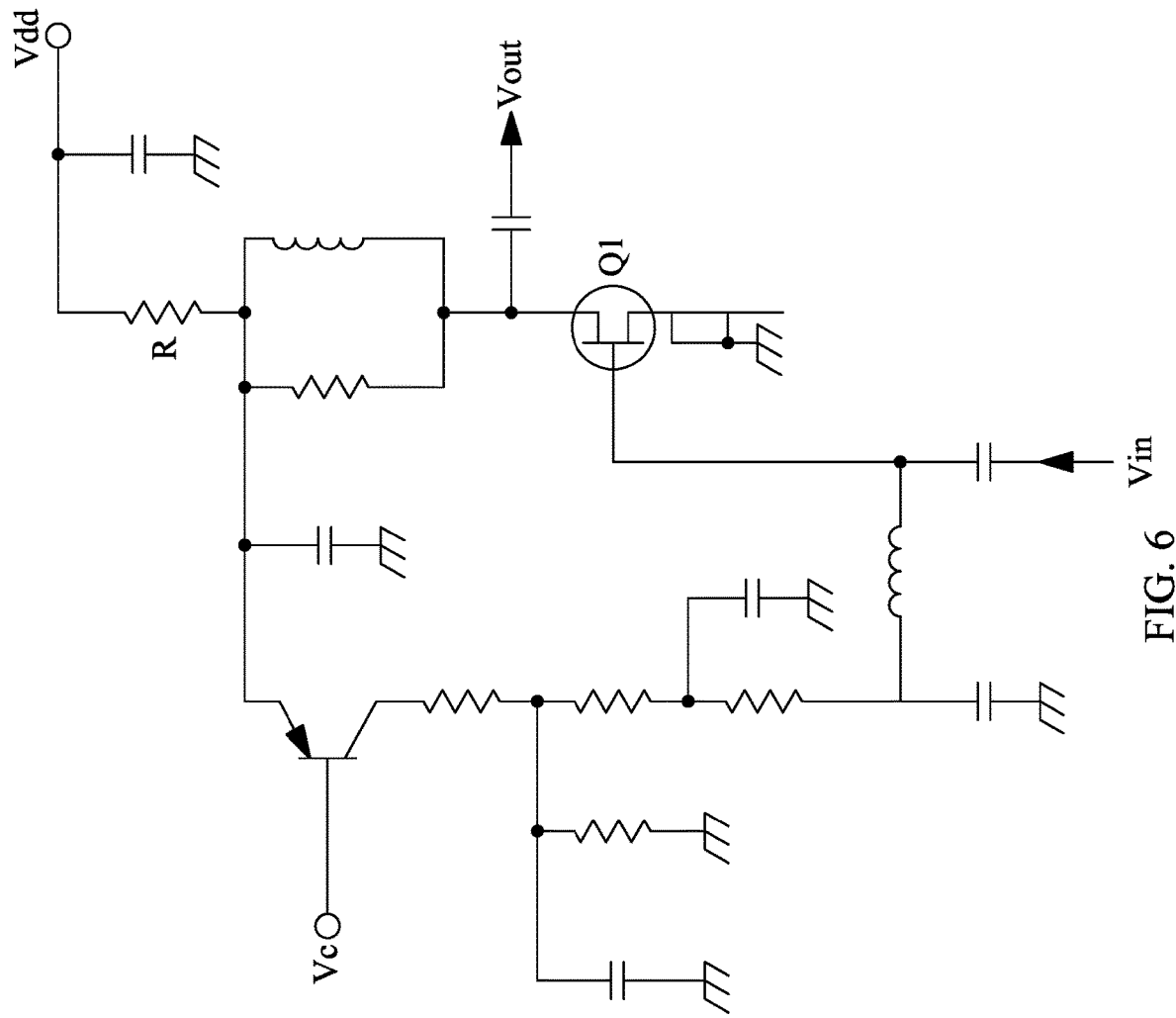
FIG. 6 illustrates an example embodiment of an adjustment to an amplifier of a communication terminal in accordance with the present disclosure.

FIG. 6 illustrates an example embodiment of an adjustment to the amplifier 24. As illustrated, the gain control of the amplifier 24 is configured to be adjusted by application of a bias voltage. In FIG. 6, the linearity of the amplifier 24 is controlled by a control voltage Vc. The drain current of the amplifier 24 is determined by the voltage difference between the power supply voltage Vdd and the control voltage Vc, as well as by the value of the resistor R. Decreasing the control voltage Vc will increase the drain current of the amplifier 24, thus making the amplifier 24 more linear and allowing the amplifier to tolerate a higher interference level. The gain control circuitry 40 can thus cause the adjustment to the amplifier 24 by altering the control voltage Vc applied to the amplifier 24.

In an additional or alternative embodiment, interference can also be determined based on an output from the digital signal processor 32. FIG. 4 illustrates a second example embodiment of the filter control circuitry 36 and the gain control circuitry 40. In the embodiment illustrated in FIG. 4, the filter control circuitry 36 and/or the gain control circuitry 40 receive an output from the digital signal processor 32 for use in triggering the adjustment of the filter 22 and/or amplifier 24. The embodiment illustrated in FIG. 4 can be used in addition to or as an alternative to the first embodiment shown in FIG. 3.

In the embodiment of FIG. 4, the digital signal processor 52 includes or is in communication with an interference detector. The digital signal processor 52 also receives or has stored a reference interference signal S3 and/or a related interference threshold. The digital signal processor 52 uses the reference interference signal S3 and/or interference threshold to detect interference in the radio signal, in addition to or alternatively from the interference detection performed prior to the conversion circuitry 28 in FIG. 3. The embodiment of FIG. 4 thus illustrates that feedback from the digital signal processor 52 can also be used to cause an adjustment to the filter 22 and/or the amplifier 24.

In the embodiment of FIG. 4, the filter control circuitry 36 includes a tuning controller 80. The tuning controller 80 can be the same as, instead of, or in addition to the tuning controller 66 shown in FIG. 3. The tuning controller 80 functions similarly to the tuning controller 66 described herein, for example, by adjusting a voltage applied to the filter 22 to cause an adjustment of the filter 22. The adjustment to the filter 22 causes the filter 22 to adjust its frequency response as described herein. In an embodiment, the digital signal processor 32 is configured to output an FFT of the radio signal. The digital signal processor 32 includes or is connected to the interference detector configured to receive the output. The interference detector is configured to determine that there is interference if the value of the power level at a specific frequency is higher than the reference interference signal level. This information is then fed to the tuning controller 80 to cause the filter 22 to adjust its frequency response as described herein.

In the embodiment of FIG. 4, the gain control circuitry 40 includes a gain controller 82. The gain controller 82 can be the same as, instead of, or in addition to the gain controller 72 shown in FIG. 3. The gain controller 82 functions similarly to the gain controller 72 described herein, for example, by adjusting a voltage applied to the amplifier 24 to cause an adjustment of the amplifier 24. The adjustment to the amplifier 24 causes the filter 22 to adjust its dynamic range as described herein. In an embodiment, the digital signal processor 32 is configured to output the FFT of the wideband radio signal. The digital signal processor 32 includes or is connected to the interference detector configured to receive the output. The interference detector is configured to determine that there is interference if the value of the power level at a specific frequency is higher than the reference interference signal level. This information is then fed to the gain controller 82 to trigger the amplifier 24 to adjust its dynamic range as described herein.

In an embodiment, the communication terminal 12 includes control circuitry 36, 40 configured to cause an adjustment to at least one of the filter 22 or the amplifier 24 based on an output from at least one power detector 64, 70. The control circuitry can be controlled by the controller 18. The control circuitry can include one or both of the filter control circuitry 36 and/or the gain control circuitry 40 configured cause the adjustment based on the output from the at least one power detector 64, 70. The control circuitry is configured to cause the adjustment by adjusting a voltage applied to at least one of the filter 22 or the amplifier 24 as described herein.

The embodiments described herein provide improved systems and methods for enabling communication terminals for radio communications. These systems and methods are advantageous, for example, because they minimize or eliminate interference in radio signals. It should be understood that various changes and modifications to the systems and methods described herein will be apparent to those skilled in the art and can be made without diminishing the intended advantages.

General Interpretation of Terms

In understanding the scope of the present invention, the term "comprising" and its derivatives, as used herein, are intended to be open ended terms that specify the presence of the stated features, elements, components, groups, and/or steps, but do not exclude the presence of other unstated features, elements, components, groups, integers and/or steps. The foregoing also applies to words having similar meanings such as the terms, "including", "having" and their derivatives. Also, the terms "part," "section," or "element" when used in the singular can have the dual meaning of a single part or a plurality of parts.

The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A communication terminal configured for satellite and terrestrial communications, the communication terminal comprising:
   an antenna configured to receive a radio signal from a satellite system and an interference signal from a terrestrial system;
   a first filter located along a signal path extending from the antenna to processing circuitry, the first filter configured to filter the radio signal to remove the interference signal; and
   filter control circuitry which branches off of the signal path, the filter control circuitry including a second filter and a power detector, the filter control circuitry configured to detect the interference signal received by the antenna and cause an adjustment to the first filter to block the interference signal based on an output from the power detector.

2. The communication terminal of claim 1, wherein the filter control circuitry is configured to cause the adjustment to the first filter based on a difference between the output from the power detector and a reference interference signal or threshold.

3. The communication terminal of claim 1, comprising a digital signal processor configured to process the radio signal,
   the filter control circuitry configured to cause the adjustment to the first filter based on an output from the digital signal processor.

4. The communication terminal of claim 1, wherein the filter control circuitry is configured to cause the first filter to block a frequency of the interference signal.

5. The communication terminal of claim 1, wherein the filter control circuitry is configured to cause the adjustment to the first filter by adjusting a voltage applied to the first filter.

6. The communication terminal of claim 1, wherein the filter control circuitry is configured to determine when the interference signal is no longer present at the antenna and cease causing the adjustment to the first filter when the interference signal is no longer present.

7. The communication terminal of claim 1, comprising an amplifier configured to amplify the radio signal, and gain control circuitry configured to detect the interference signal received by the antenna and cause an adjustment to the amplifier based on the detected interference signal.

8. The communication terminal of claim 1, wherein the filter control circuitry includes a mixer configured to output a downconverted signal based on a phase-locked loop frequency, and the second filter is configured to filter the downconverted signal output from the mixer.

9. The communication terminal of claim 1, wherein the first filter is an MEMS filter, and the second filter is a narrow band-pass filter.

10. A communication terminal configured for satellite and terrestrial communications, the communication terminal comprising:
an antenna configured to receive a radio signal from a satellite system and an interference signal from a terrestrial system;
a filter located along a primary signal path extending from the antenna to processing circuitry configured to process the radio signal, the filter configured to receive the radio signal from the antenna,
a low-noise amplifier located along the primary signal path extending from the antenna to the processing circuitry, the low-noise amplifier having a dynamic range with a low end and a high end and being configured to amplify the radio signal after the radio signal passes the filter;
gain control circuitry located along a gain control path which branches off of the primary signal path, the gain control circuitry configured to detect the interference signal received by the antenna and raise the high end of the dynamic range of the low-noise amplifier based on the detected interference signal; and
filter control circuitry located along a filter control path which branches off of the primary signal path and is separate from the gain control path, the filter control circuitry configured to cause an adjustment to the filter.

11. The communication terminal of claim 10, wherein the gain control circuitry is configured to cause the adjustment to the low-noise amplifier by adjusting a voltage applied to the low-noise amplifier.

12. The communication terminal of claim 10, wherein the gain control circuitry includes a power detector, and the gain control circuitry is configured to raise the high end of the dynamic range of the low-noise amplifier based on an output from the power detector.

13. The communication terminal of claim 12, wherein the gain control circuitry is configured to raise the high end of the dynamic range of the low-noise amplifier based on a difference between the output from the power detector and a reference interference signal or threshold.

14. The communication terminal of claim 10, comprising a digital signal processor configured to process the radio signal,
the gain control circuitry configured to raise the high end of the dynamic range of the low-noise amplifier based on an output from the digital signal processor.

15. The communication terminal of claim 10, wherein the gain control circuitry is configured to determine when the interference signal is no longer present at the antenna and cease raising the high end of the dynamic range of the low-noise amplifier when the interference signal is no longer present.

16. A communication terminal configured for satellite and terrestrial communications, the communication terminal comprising:
an antenna configured to receive a radio signal from a satellite system and an interference signal from a terrestrial system;
a filter located along a signal path extending from the antenna to processing circuitry, the filter configured to filter the radio signal;
an amplifier located along the signal path extending from the antenna to the processing circuitry, the amplifier configured to amplify the radio signal;
at least one power detector configured to detect power related to the radio signal; and
filter control circuitry which branches off of the signal path, the filter control circuitry configured to cause an adjustment to the filter based on a subtracted difference between a reference interference signal or threshold and an output from the at least one power detector.

17. The communication terminal of claim 16, wherein the filter control circuitry is configured to cause the adjustment by adjusting a voltage applied to the filter.

18. The communication terminal of claim 16, wherein the filter control circuitry includes a mixer, the at least one power detector and a tuning controller,
the mixer is configured to downconvert the radio signal,
the at least one power detector is configured to detect power of the downconverted radio signal after output from the mixer, and
the tuning controller is configured to cause the adjustment to the filter based on the subtracted difference between the reference interference signal or threshold and the output from the at least one power detector.

19. The communication terminal of claim 18, wherein the filter is a first filter,
the filter control circuitry includes a second filter configured to filter the downconverted radio signal after output from the mixer, and
the at least one power detector is configured to detect power of the radio signal after output from the second filter.

20. The communication terminal of claim 16, comprising gain control circuitry configured to cause an adjustment to the amplifier to bias a high end of a dynamic range of the amplifier when the interference signal is determined to be present and to cease causing the adjustment to the amplifier when the interference signal is no longer present.

* * * * *